United States Patent [19]

Ford et al.

[11] Patent Number: 4,910,748
[45] Date of Patent: Mar. 20, 1990

[54] LASER CATHODE COMPOSED OF OXIDIZED METALLIC PARTICLES

[76] Inventors: Carol M. Ford, 3942 Main St., NE, Columbia Heights, Minn. 55421; Theordore J. Podgorski, 1764 Maryknoll Ave., Maplewood, Minn. 55109

[21] Appl. No.: 286,928
[22] Filed: Dec. 20, 1988
[51] Int. Cl.$^4$ .............................................. H01S 3/097
[52] U.S. Cl. .................................. 372/87; 313/346 R
[58] Field of Search ............... 372/87; 313/346 DC, 313/346 R

[56] References Cited

U.S. PATENT DOCUMENTS

| | | | |
|---|---|---|---|
| 2,858,470 | 10/1958 | Thurber | 313/346 DC |
| 4,146,438 | 3/1979 | de Nora et al. | 204/1.5 |
| 4,434,493 | 2/1984 | Chaffee | 372/87 |
| 4,595,377 | 6/1986 | Norvell | 313/346 R |
| 4,671,777 | 6/1987 | Esdonk et al. | 313/346 DC |
| 4,675,091 | 6/1987 | Thomas et al. | 313/346 R |
| 4,675,570 | 6/1987 | Green | 313/346 DC |

FOREIGN PATENT DOCUMENTS

| | | | |
|---|---|---|---|
| 0213489 | 3/1987 | European Pat. Off. | 372/87 |
| 0084885 | 4/1986 | Japan | 372/87 |

Primary Examiner—Frank Gonzalez
Attorney, Agent, or Firm—Robert A. Pajak

[57] ABSTRACT

A long life cathode for laser generators consisting of a monolithic body of an agglomeration of oxidized metallic particles of beryllium or aluminum.

42 Claims, 1 Drawing Sheet

LASER CATHODE COMPOSED OF OXIDIZED METALLIC PARTICLES

BACKGROUND OF THE INVENTION

The present invention relates generally to gas discharge devices, and more particularly to the cathode construction found in such devices.

A laser typically employs an unheated or cold cathode which is secured to a laser body or housing as a source of electron admission for laser operation. The body of the laser may be composed of glass or glass like materials, generally having low coefficients of thermal expansion. The cathode may be composed of a metal or metal-alloy material, for example aluminum, well known in the art. The cathode is generally secured to the laser body by a gas tight seal, and is adapted to be connected to a negative electric potential source.

In gas lasers having a limited gas supply, cathode sputtering is one of the major causes of shortened laser life. In a helium-neon gas laser, positive charged gas ions of the plasma are attracted to the negatively charged cathode, and release negatively charged electrons. Unfortunately, the positively charged ions can dislodge cathode material molecules from the active electron emitting surface of the cathode. This phenomenon is usually referred to as cathode sputtering. For gas laser applications, cathode sputtering results in decreased laser life. As a result of cathode sputtering, the dislodged cathode material can, in turn, trap lasing gas molecules to the walls of the cathode and the walls of the laser cavity. If the supply of gas is limited, the reduction of available gas ions can cause the lasing action to cease.

Metallic cathodes, particularly aluminum cathodes, have been widely used in the art for gas lasers. An aluminum cathode generally has the cathode emitting surface coated with a thin layer of oxide to prevent cathode sputtering. During the cathode manufacturing process, a layer of oxide is formed naturally by exposing a cleaned aluminum cathode emitting surface to an oxygen plasma with the aluminum cathode connected as the cathode in an electrical circuit. A thin layer of oxide is formed on the aluminum electron emitting surface due to the pressure of oxygen and oxygen ions hitting the cathode surface.

Aluminum cathodes having the oxide layer have improved laser life above that of uncoated aluminum due to increasing the resistance to sputtering. This is so since the oxide layer is generally harder than the aluminum. Nevertheless, irregularities in the emitting surface of the cathode can result in localized ion flow which in time breaks down the oxide layer, and begins localized sputtering of the cathode resulting in extinction of the laser.

Further, in some laser applications, it is desirable that the cathode have a very low thermal coefficient of expansion so that it can be secured to a laser body or block which has a very low coefficient of thermal expansion. A body of a laser comprised of quartz like products such as Zerdor and Cervit has a very low coefficient of thermal expansion. In these circumstances, it is highly desirable that the coefficient of thermal expansion of the cathode be as low as possible and preferably match the coefficient of thermal expansion of the laser body.

SUMMARY OF THE INVENTION

It is an object of the present invention to provide a cathode which enhances laser life.

It is another object of the invention to provide a cathode having a very low coefficient of thermal expansion and is resistant to the deleterious effects of cathode sputtering caused by the lasing gas plasma within an active gas laser.

These and other objects of the invention are realized in accordance with the present invention in the employment of a cathode comprising a monolithic body consisting essentially of an agglomeration of oxidized metallic particles. The oxidized metallic particles may be agglomerated together by a sintering process or any process including heat and/or pressure such that the characteristics of the oxidized metallic particles is retained. In the preferred embodiment of the invention, the metallic particles consists essentially of a base metal of either aluminum or beryllium in which the particles have an oxidized layer. Further, the emitting surface of the cathode may be coated with an oxide layer.

BRIEF DESCRIPTION OF THE INVENTION

Figure 1:
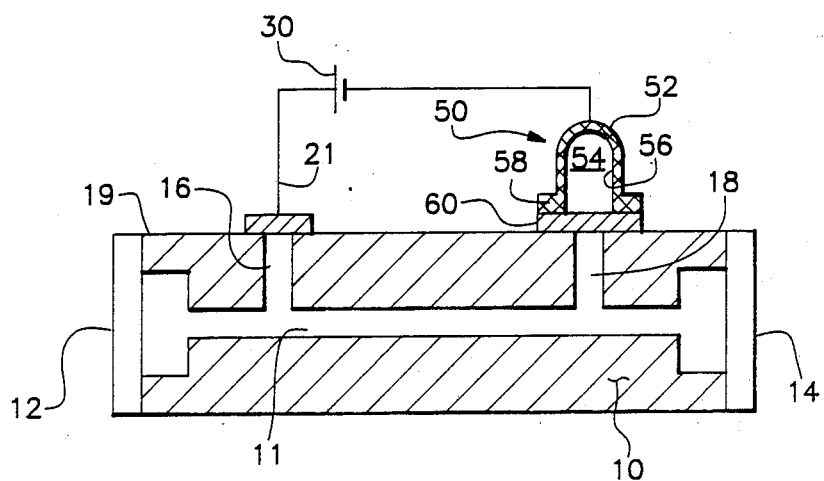
FIG. 1 is a schematic diagram of a gas laser.

FIG. 1 illustrates a cathode commonly used for a wide variety of gas lasers. The laser is generally comprised of a body 10 having a cavity 11 containing a gas or gas mixture such as helium and neon. Fixed to the laser body are mirrors 12 and 14 for establishing a laser path therebetween.

In communication with cavity 11 are passageways 16 and 18, both extending between the surface 19 of body 10 and cavity 11.

Covering passageway 16 at surface 19 is a first electrode 21 utilized as an anode. Anode 21 is adapted to be electrically connected to the positive side of electric potential source 30. Anode 21 is secured to body 10 by a gas tight seal, e.g., an indium seal (not shown), in a well known manner. Anode 21 is intended to be in communication with passageway 16 to provide an electrical discharge path through the gas.

Similarly, a second electrode 50 covers passageway 18 at surface 19 and is utilized as a cathode. Cathode 50 is adapted to be electrically connected to the negative side of source 30. Cathode 50 is intended to be in communication with passageway 18 to also provide an electrical discharge path through the gas.

Figure 2:
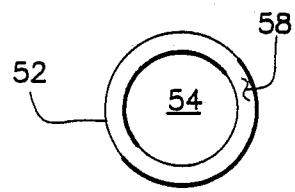
FIG. 2 is a bottom view of the cathode illustrated in FIG. 1.

As is generally illustrated in FIGS. 1 and 2, cathode 50 is comprised of a body 52 having a cavity 54 with a cathode emitting surface 56. Cathode 50 may be fixed to laser body 10 by an indium seal 60, or by any other appropriate manner.

Figure 3:
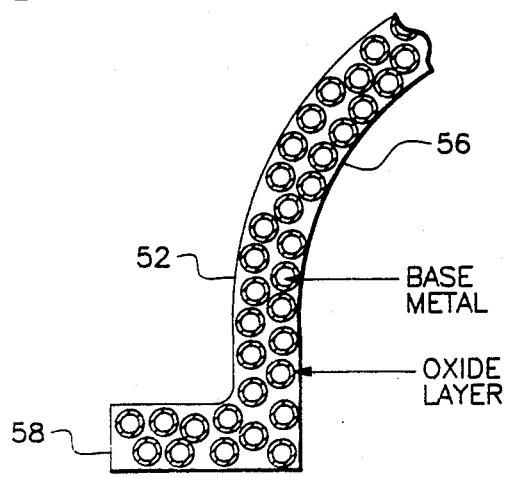
FIG. 3 is a microscopic view of the wall of the cathode in accordance with the present invention.

In the present invention, cathode 50 is constructed of a monolithic body consisting essentially of an agglomeration of oxidized metallic particles as is particularly illustrated in FIG. 3. Each particle is essentially a base metal having an oxidized outer layer. When the particles are subjected to a sintering like process, the particles are agglomerated together to form a monolithic body having excellent mechanical an electrical characteristics.

In addition, a cathode composed of these oxidized particles is extremely resistant to sputtering caused by the plasma gas in laser applications. This resistance to sputtering is thought to be attributed to the fact that each particle is provided with its own oxide layer similar to the usual oxide layer of aluminum cathodes as described earlier.

The sintering process as used herein includes any application of heat and or pressure to cause the agglomeration of the metallic particles. Further, the agglomeration process must be one which does not destroy the oxide layers of the particles, for the most part, and allows the retention of the characteristics of the oxidized metal particles. In the preferred embodiment of the invention, the metallic particles consists essentially of beryllium or aluminum.

The electrode may be machined from rods or blocks of the agglomerated oxidized metal particles to form a selected cathode structure. Alternatively, the electrode may be formed by pressing a powder of the oxidized metallic particles before subjecting the mold to a sintering like process to produce the monolithic electrode. Preferably, the structure of the cathode for laser applications may include a dome shaped cavity and a mounting flange as is well known.

It should be understood that the monolithic body of the oxidized metallic particle may include dopant materials to alter any of the mechanical or electrical characteristics as desired. Specifically, the electrical conductivity and thermal coefficient of expansion of the resultant electrode can be selected.

The cathode, or the rods or blocks, in accordance with the present invention may be produced by the use of powders which are tightly compressed into a mold to fill all of the voids. Further, the temperature of the mold and powders is raised to a temperature preferably below the melting point to form a ceramic-like structure.

In the preferred embodiment of the invention, a rod of Brush Wellman Inc. beryllium identified as "S-200F" was machined to produce a long life cathode.

In another embodiment of the invention, a beryllium cathode, composed of the oxidized metallic particles, may be machined to have a dome-shaped cavity similar to that shown in the accompanying drawings. The cathode was mounted to a laser body and filled with an oxygen gas so that the highly reactive beryllium electrode could be coated with an oxide film by simple oxidation with oxygen gas. After oxidation, the oxygen is removed from the laser body and subsequently filled with a lasing gas. The electrode is then connected to a negative electric potential and used as the laser cathode.

Brush Wellman Inc.'s product brochure entitled,'-'DESIGNING WITH BERYLLIUM" (circa 1988), describes the powders of oxidized particles of beryllium, and rods composed of an agglomeration of such powders by a sintering-like process. Production of beryllium powder begins at Brush Wellman Inc. with the extraction of the metal from the ore through a series of chemical operations. Primary beryllium is produced as "pebbles" by the magnesium reduction of anhydrous beryllium fluoride. The pebbles are vacuum remelted to remove reduction slag and cast into ingots. In the cast form, the metal is very difficult to machine and mechanical properties are poor. For these reasons, virtually all Brusch Wellman Inc. beryllium enters service as a powder metallurgy-derived product. Powder is prepared by chipping the ingots and mechanically grinding the chips to the appropriate particle size distribution for consolidation into essentially full density billets by powder metallurgy techniques. Since Beryllium is highly reactive, the particle will become quickly oxidized in the earth's atmosphere, thus being oxidized metallic particles.

Beryllium powders available from Brush Wellman Inc. include those having approximately a minimum of 98% Be and a maximum of 2% BeO and trace amounts of other elements.

The mechanical grinding system used to manufacture beryllium powder of a given particle size distribution has been shown to have an effect upon the characteristics of the fully dense body prepared with the powder. This is most notable in the level of minimum tensile elongation which can be generated in any direction at room temperature. This is true because of the anisotropy of the basic beryllium crystal with room temperature slip capability limited to a single direction coupled with basal plane cleavage as a major fracture mode.

Most grinding procedures for beryllium result in a powder with a high fraction of particles with a flat plate configuration which tends to orient in powder handling and consolidation operations. Impact grinding (also known as jet milling) is a procedure for grinding chips to powder involving the impact of beryllium chip propelled by high pressure gas against a beryllium target. Powder produced in this manner is more equilaxed than attritioned powder with less tendency towards crystallogrphic orientation in handling and consolidation procedures.

These powders or variations of these powders are used to produce vacuum hot pressed block and as input for wrought products. They are also used for other powder metallurgy processes such as, among others, cold pressing or cold isopressing followed by sintering, hot isopressing, slip casting, plasma spraying, pressureless sintering, powder extrusion, powder forging, powder rolling, explosive compaction, or as specifically formulated input for block with improved properties or better fabricability.

The most basic form of beryllium is vacuum hot-pressed block. The hot pressing operation consisting of the application of heat and pressure to beryllium powder contained in a suitable die results in a uniform, fully dense, fine-grained beryllium which has been thoroughly out-gassed by the use of vacuum during the operation.

Through variation in chemical composition, particle size distribution, and temperature it is possible to produce a variety of beryllium grades with differing characteristics for many divergent applications. S-200F is a standard grade of vacuum hot-pressed beryllium produced by Brush Wellman Inc.

Various modifications of the invention may be made without departing from the true spirit and scope of the present invention, and it is to be understood that the invention is intended to be limited only a defined in the following claims. More specifically, the cathode in accordance with the present invention may be employed by a wide variety of lasers, including ring lasers and multi-frequency ring lasers.

The embodiments of an invention in which an exclusive property or right is claimed are defined as follows:

1. A cathode for a laser generator comprised of a monolithic body consisting essentially of an agglomeration of oxidized metallic particles.

2. The cathode of claim 1 wherein said oxidized metallic particles have been agglomerated together by a sintering process.

3. The cathode of claim 1 wherein said particles have been agglomerated together by pressure.

4. The cathode of claim 1 wherein said particles have been agglomerated together by heat.

5. The cathode of claim 1 wherein said particles have been agglomerated together by heat and pressure.

6. The cathode of claim 1 in which said metallic particles consists essentially of a base metal having an oxidized layer.

7. The cathode of claim 6 in which said base metal is beryllium.

8. The cathode of claim 6 in which said base metal is aluminum.

9. The cathode of claim 1 further comprising an emitting surface having a thin oxide layer.

10. A cathode for a laser generator comprised of a monolithic body composed of an agglomeration of a powder consisting essentially of oxidized metallic particles.

11. The cathode of claim 10 wherein said oxidized metallic particles have been agglomerated together by a sintering process.

12. The cathode of claim 10 wherein said particles have been agglomerated together by pressure.

13. The cathode of claim 10 wherein said particles have been agglomerated together by heat.

14. The cathode of claim 10 wherein said particles have been agglomerated together by heat and pressure.

15. The cathode of claim 10 in which said metallic particles consists essentially of a base metal having an oxidized layer.

16. The cathode of claim 15 in which said base metal is beryllium.

17. The cathode of claim 15 in which said base metal is aluminum.

18. The cathode of claim 10 further comprising an emitting surface having a thin oxide layer.

19. A laser generator comprising:
a body for containing a gas;
an electric potential source;
an electrode in communication with said gas, said electrode secured to said body with a gas tight seal, said electrode being adapted to be electrically connected to a negative side of said source; and
wherein said electrode is substantially composed of a monolithic body consisting essentially of an agglomeration of oxidized metallic particles.

20. The cathode of claim 19 wherein said oxidized metallic particles have been agglomerated together by a sintering process.

21. The cathode of claim 19 wherein said particles have been agglomerated together by pressure.

22. The cathode of claim 19 wherein said particles have been agglomerated together by heat.

23. The cathode of claim 19 wherein said particles have been agglomerated together by heat and pressure.

24. The cathode of claim 19 in which said metallic particles consist essentially of a base metal having an oxidized layer.

25. The cathode of claim 24 in which said base metal is beryllium.

26. The cathode of claim 24 in which said base metal is aluminum.

27. The cathode of claim 19 further comprising an emitting surface having a thin oxide layer.

28. A laser generator comprising:
a body for containing a gas;
an electric potential source;
an electrode secured to said body a gas tight seal, said electrode being adapted to be electrically connected to a negative side of said source; and
wherein said electrode is a monolithic body composed of an agglomeration of a powder consisting essentially of oxidized metallic particles.

29. The electrode of claim 28 wherein said oxidized metallic particles have been agglomerated together by a sintering process.

30. The electrode of claim 28 wherein said particles have been agglomerated together by pressure.

31. The electrode of claim 28 wherein said particles have been agglomerated together by heat.

32. The electrode of claim 28 wherein said particles have been agglomerated together by heat and pressure.

33. The electrode of claim 28 in which said metallic particles consists essentially of a base metal having an oxidized layer.

34. The electrode of claim 33 in which said base metal is is beryllium.

35. The electrode of claim 33 in which said base metal is aluminum.

36. A method for making an electrode for engagement with a laser housing comprising the steps of:
forming a selected electrode body structure of a powder consisting substantially of oxidized particles of at least one metal; and
heating said electrode structure for a sufficient time to cause said powder to bond together to form a monolithic body and which infuses high compressive and mechanical strengths, has high temperature stability, and low permeability to a gas, does not exhibit out-gassing, and is resistant to oxidation.

37. The method of claim 36 wherein said forming further comprises compressing said powder into a mold to form said electrode body.

38. The method of claim 36 further comprising the step of subjecting said electrode body to a selected pressure greater than atmospheric pressure.

39. The method claim 36 wherein said powder includes a material selected from a group consisting of oxidized particles of beryllium and oxidized aluminum.

40. The method of claim 36 wherein said electrode body structure includes a cavity having an entrance port surrounded by a mounting surface.

41. The method of claim 36 further comprising the step of mounting said electrode to a laser body, and connecting said electrode to a negative potential source thereby operating said electrode as a cathode.

42. A method for making an electrode for engagement with a laser housing comprising the steps of:
machining a monolithic body consisting substantially of oxidized particles of at least one metal to form a selected electrode body structure;
mounting said electrode body to said laser body; and
oxidizing said electrode structure.

* * * * *